(12) United States Patent
Bell

(10) Patent No.: US 9,905,130 B2
(45) Date of Patent: Feb. 27, 2018

(54) METHOD AND SYSTEM FOR IDENTIFYING A PARKING SPACE

(71) Applicant: Landon Bell, Dallas, TX (US)

(72) Inventor: Landon Bell, Dallas, TX (US)

(73) Assignee: Landon Bell, Dallas, TX (US)

( * ) Notice: Subject to any disclaimer, the term of this patent is extended or adjusted under 35 U.S.C. 154(b) by 0 days.

(21) Appl. No.: 15/094,376

(22) Filed: Apr. 8, 2016

(65) Prior Publication Data

US 2017/0294122 A1    Oct. 12, 2017

(51) Int. Cl.
*B60Q 1/48* (2006.01)
*G08G 1/14* (2006.01)

(52) U.S. Cl.
CPC .................................. *G08G 1/144* (2013.01)

(58) Field of Classification Search
CPC .............................. H04W 4/00; G06Q 10/00
See application file for complete search history.

(56) References Cited

U.S. PATENT DOCUMENTS

| 2012/0190386 A1* | 7/2012 | Anderson | G01C 15/04 |
| | | | 455/456.3 |
| 2016/0012726 A1* | 1/2016 | Wang | G08G 1/0112 |
| | | | 340/932.2 |

OTHER PUBLICATIONS

"Search Report," for U.S. PCT Patent Application No. PCT/US17/24352, dated Apr. 28, 2017, 4 pages.
"Written Opinion," for U.S. PCT Patent Application No. PCT/US17/24352, dated Apr. 28, 2017, 8 pages.

* cited by examiner

*Primary Examiner* — Shirley Lu

(57) ABSTRACT

A computer-implemented method, a computer-implemented process, and a system for identifying a parking space may provide a computer application to allow communication between an arriving user and exiting user. An arrival time that may correspond to the arriving user and exit time that may correspond to the exiting user may be matched to identify a parking space in an authorized location common to the arriving user and the exiting user. The arriving user may be provided a trade identification that may include information that may describe an exiting vehicle. The exiting user may remove the exiting vehicle from the parking space, and an arriving user may park an arriving vehicle in the parking space.

20 Claims, 9 Drawing Sheets

METHOD AND SYSTEM FOR IDENTIFYING A PARKING SPACE

FIELD OF THE DISCLOSURE

The present disclosure relates generally to a method and a system for identifying a parking space. In particular, the disclosure relates to a method and a system for identifying a parking space by completing a trade between an arriving user and an exiting user.

BACKGROUND

Parking space availability, particularly in metropolitan areas, can play an integral role in attracting or deterring consumers from visiting retail locations and restaurants. Potential customers sometimes may be deterred from visiting these locations because parking space availability is limited, particularly near popular retail locations and restaurants. Many parking reservation services, including valet parking, garage parking, and mobile parking applications, require payment or some collateral between the user seeking a parking space and another party. Additionally, users of these parking reservation services may tend to spend less money on retail items and other consumer goods because they may be required to pay for parking. Additionally, users may spend a significant amount of time searching for a parking space, thereby wasting time and gas in an effort to locate parking before entering the doors of the retail location or restaurant.

SUMMARY

Embodiments of the present disclosure may provide a computer-implemented method for identifying a parking space. The method may include displaying at least one authorized location in a computer application. The method may include selecting the at least one authorized location from the computer application and requesting a parking space. An arriving user may select the at least one authorized location from the computer application. The computer-implemented method may provide matching an arrival time with an exit time. The arriving user may select the arrival time and an exiting user may select the exit time. The computer-implemented method may provide notifying the arriving user and the exiting user of a match between the arrival time and the exit time. The computer-implemented method may further provide displaying a trade identification to at least one of the arriving user and the exiting user. The trade identification may include information identifying at least one of an arriving vehicle and an exiting vehicle. Additionally, the computer-implemented method may provide completing a trade in which the exiting user may remove the exiting vehicle from the parking space, and the arriving user may move the arriving vehicle into the parking space. The method may further comprise determining whether the exit time is greater than a first predetermined time period prior to the arrival time, determining whether the exit time is within a second predetermined time period of the arrival time, and determining whether the arriving user and the exiting user are within overlapping authorized locations. Matching the arrival time with the exit time may further comprise determining whether the exit time is greater than a third predetermined time period prior to the arrival time, and determining whether the arrival time is within a fourth predetermined time period of the exit time. Displaying the trade identification to at least one of the arriving user and the exiting user may further comprise determining whether a current time is equivalent to a difference between an award time and a buffer time. The method also may comprise displaying user data in the computer application, the user data including any combination of a traffic report, a geographic map, authorized locations frequently selected by the arriving user, and information identifying at least one of the arriving vehicle and the exiting vehicle. The method also may include providing a plurality of parking spaces for a plurality of arriving users and a plurality of exiting users.

Embodiments of the present disclosure may provide a non-transitory computer-readable medium to execute a computer-implemented process for identifying a parking space. The computer-implemented process may be executed on a processor and may include displaying at least one authorized location in a computer application. The computer-implemented process may provide selecting the at least one authorized location from the computer application and requesting the parking space. An arriving user may select the at least one authorized location from the computer application. The computer-implemented process may provide matching an arrival time with an exit time. The arriving user may select the arrival time and an exiting user may select the exit time. The computer-implemented process may provide determining whether the exit time is greater than a first predetermined time period prior to the arrival time. The computer-implemented process may provide determining whether the exit time is within a second predetermined time period of the arrival time. Additionally, the computer-implemented process may provide determining whether the arriving user and the exiting user are within overlapping authorized locations. The computer-implemented process may provide notifying the arriving user and the exiting user of a match between the arrival time and the exit time. The computer-implemented process may further provide displaying a trade identification to at least one of the arriving user and the exiting user. The trade identification may include information identifying at least one of an arriving vehicle and an exiting vehicle. Additionally, the computer-implemented process may provide completing a trade in which the exiting user may remove the exiting vehicle from the parking space, and the arriving user may move the arriving vehicle into the parking space. The computer-implemented process may provide displaying driving instructions to the arriving user, and the driving instructions may correspond to the at least one authorized location. Matching the arrival time with the exit time may further include determining whether the exit time is greater than a third predetermined time period prior to the arrival time, and determining whether the arrival time is within a fourth predetermined time period of the exit time. Displaying the trade identification to at least one of the arriving user and the exiting user may further include determining whether a current time is equivalent to a difference between an award time and a buffer time. The computer-implemented process may further include displaying user data in the computer application, the user data including any combination of a traffic report, a geographic map, authorized locations frequently selected by the arriving user, and information identifying at least one of the arriving vehicle and the exiting vehicle. The computer-implemented process also may include providing a plurality of parking spaces for a plurality of arriving users and a plurality of exiting users, providing parking data to at least one of the arriving user or the exiting user, wherein the parking data is displayed in the computer application, and/or displaying a parking status badge to at least one arriving user or exiting user in the computer application.

Embodiments of the present disclosure may provide a system for identifying a parking space that may be provided on a mobile device. The system may include a communications module that may be provided to receive a selection of the authorized location, and a request for the parking space may be made by an arriving user. The communications module may be provided to display the authorized location on the mobile device. Further, a calculation module may be provided to match an arrival time with an exit time. The arriving user may select the arrival time and an exiting user may select the exit time. The communications module may be provided to notify the arriving user and the exiting user of a matching arrival time and exit time, and may provide at least one of the arriving user and the exiting user with a trade identification. The trade identification may include information identifying at least one of an arriving vehicle and an exiting vehicle. The system may further provide a sensor module to complete a trade and detect at least one of when the exiting user may remove the exiting vehicle from the parking space and when the arriving user moves the arriving vehicle into the parking space. The calculation module may be provided to calculate whether the exit time is greater than a first predetermined time period prior to the arrival time, calculate whether the exit time is within a second predetermined time period of the arrival time, and calculate whether the arriving user and the exiting user are within overlapping authorized locations. The calculation module also may be provided to calculate whether the exit time is greater than a third predetermined time period prior to the arrival time, and calculate whether the arrival time is within a fourth predetermined time period of the exit time. The calculation module also may calculate whether a current time is equivalent to a difference between an award time and a buffer time. A user data module may include any combination of a traffic report, a geographic map, authorized locations frequently selected by the arriving user, and information identifying the arriving vehicle. The sensor module may detect movement of a plurality of exiting vehicles from a plurality of parking spaces and a plurality of arriving vehicles into the plurality of parking spaces.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may generally provide a method and a system for identifying a parking space. An arriving user may be provided a trade identification that may include information that may describe an exiting vehicle. An exiting user may remove the exiting vehicle from a parking space, and an arriving user may park an arriving vehicle in the parking space vacated by the exiting user.

Figure 1:
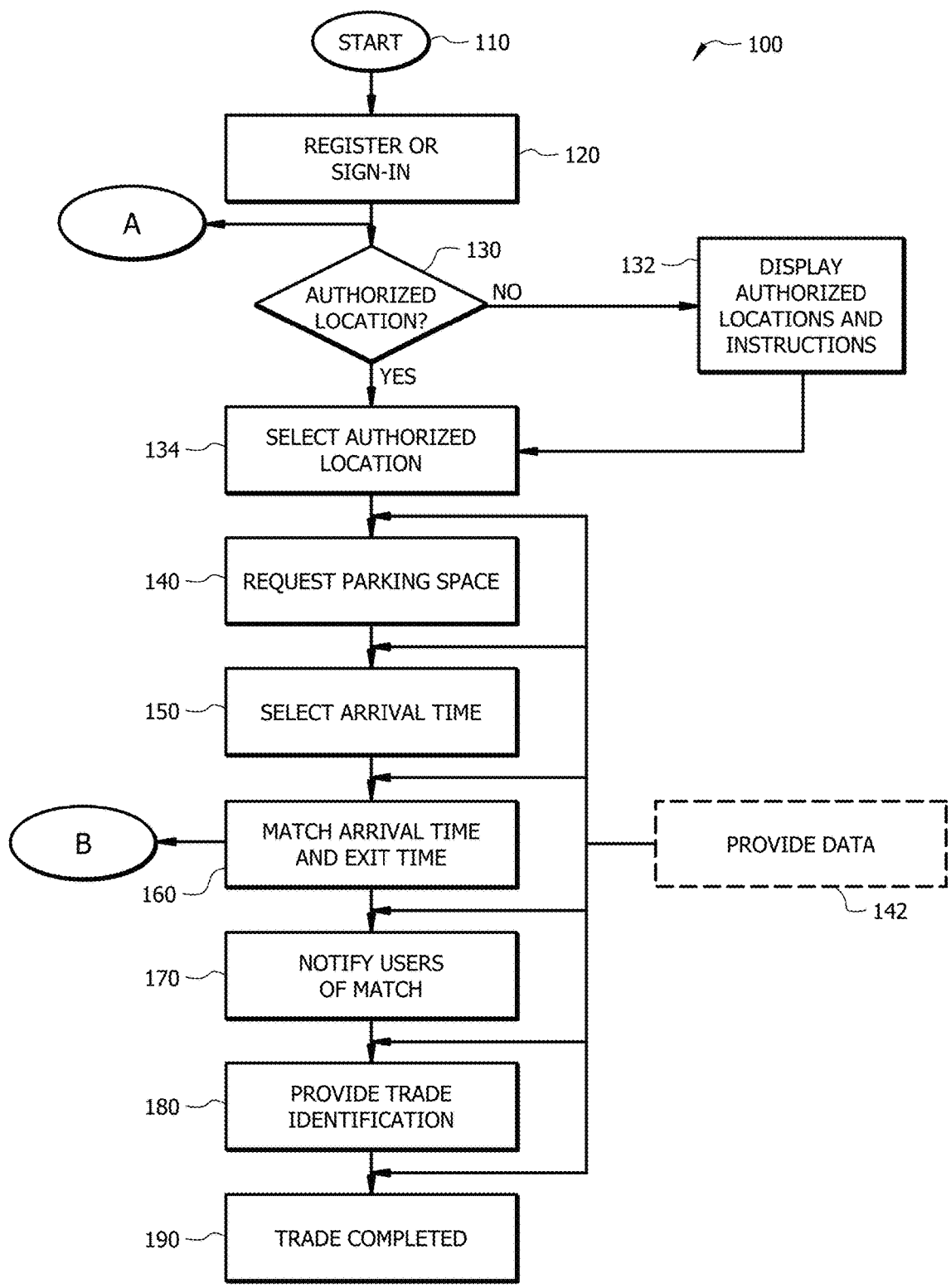
FIG. 1 depicts a method for identifying a parking space according to an embodiment of the present disclosure.
Figure 2:
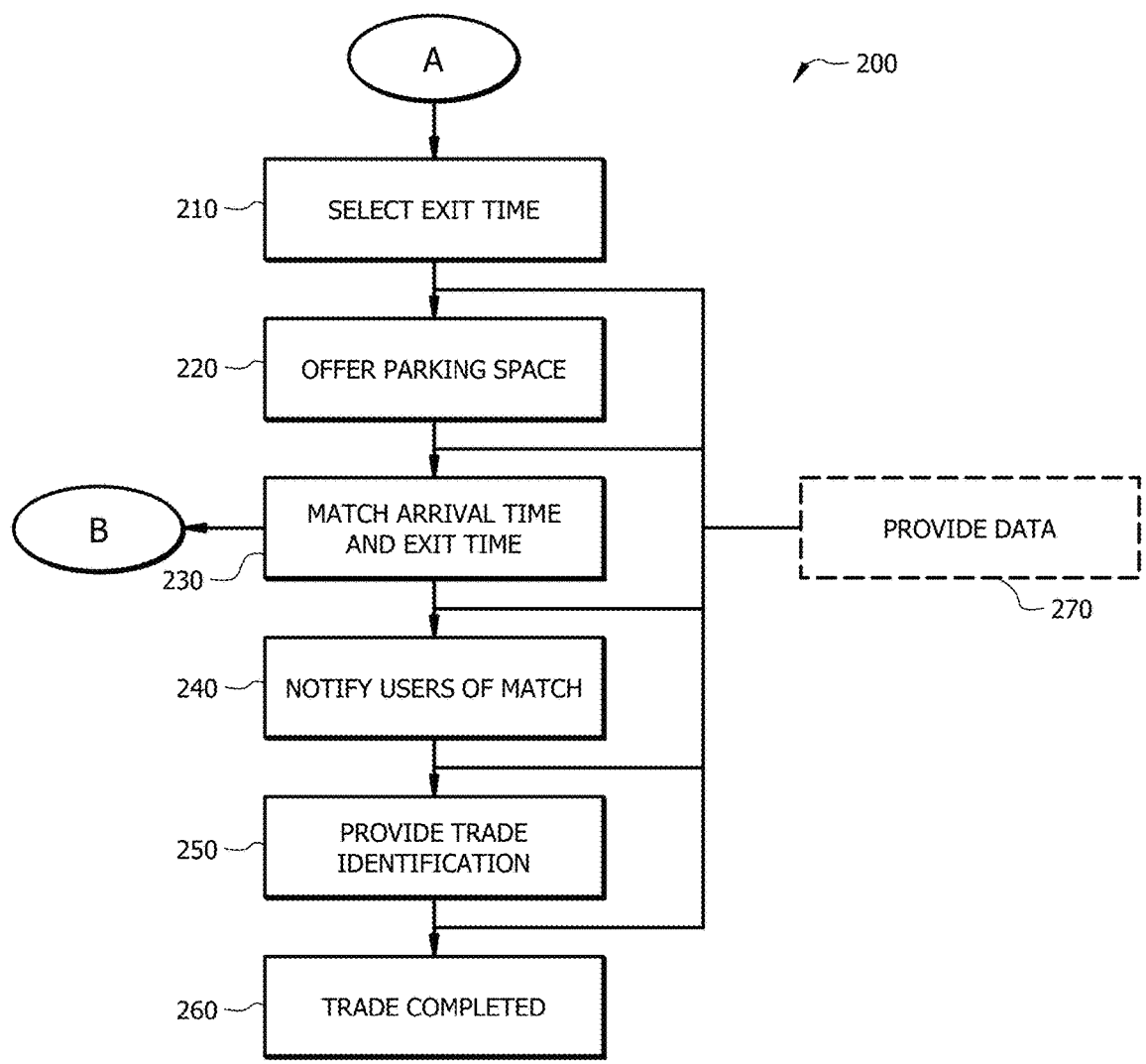
FIG. 2 further depicts a method for identifying a parking space according to an embodiment of the present disclosure.
Figure 6:
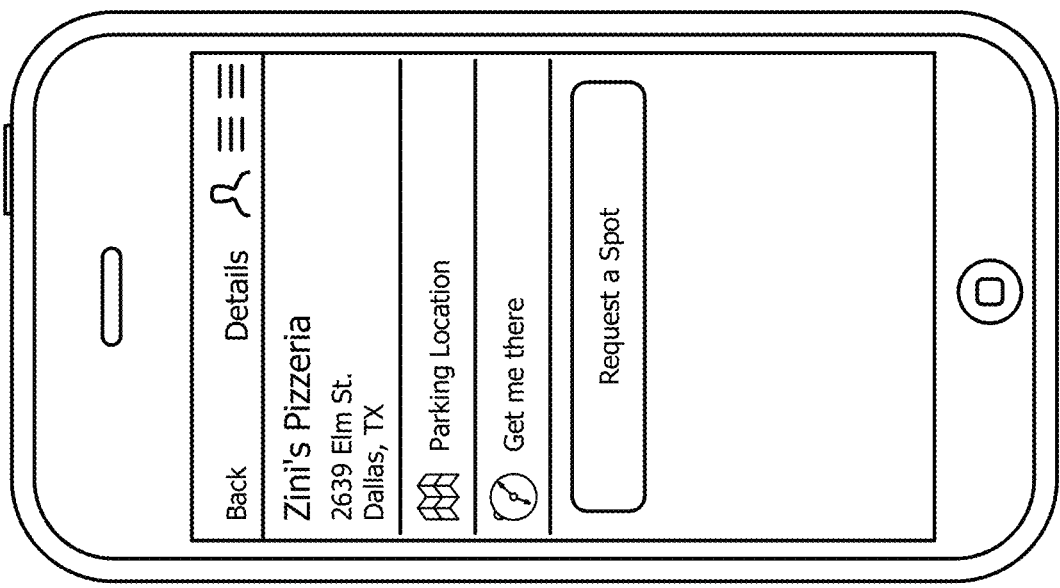
FIG. 6 depicts a screen shot of an application for identifying a parking space in which a parking space is requested according to an embodiment of the present disclosure.

FIG. 1 depicts computer-implemented method 100 ("method") that may identify a parking space according to an embodiment of the present disclosure. It should be appreciated that a non-transitory computer readable medium may execute a computer-implemented process for identifying a parking space, the computer-implemented process may be executed on a processor, and the computer-implemented process may be depicted by method 100. As depicted in FIG. 1, method 100 may start 110 a computer application ("application") that may identify a parking space for at least one arriving user. It should be appreciated that the application may be designed to run on mobile devices that may include, but may not be limited to, mobile phones, tablets, and vehicle media devices. Method 100 may provide the step of registering or signing in the arriving user 120. It should be appreciated that method 100 also may register or sign-in at least one exiting user 120 without departing from the present disclosure. It should be appreciated that "A", as shown in FIGS. 1 and 2, reflect utilizing method 100 for an exiting user, as opposed to an arriving user, as further described below regarding FIG. 2. Method 100 may provide the step of determining at least one of a plurality of authorized locations 130. When at least one authorized location is displayed (130—YES), method 100 may allow the arriving user to select an authorized location from an application 134. It should be appreciated that method 100 may be provided to determine whether the arriving user is located in and/or near an authorized location without departing from the present disclosure. When at least one authorized location is not determined (130—NO), method 100 may provide the step of displaying authorized locations to the arriving user 132 as well as instructions, if needed, for moving the arriving vehicle to an authorized location. Method 100 may then allow the arriving user to select an authorized location from an application 134. Method 100 may allow the arriving user to request a parking space 140 (i.e., by selecting "Request a Spot" in an application, as depicted in FIG. 6 according to an embodiment of the present disclosure). It should be appreciated that requesting a parking space may provide scanning for available parking spaces. It should further be appreciated that requesting a parking space may not provide the arriving user with an ability to select a specific parking space because the arriving user may select an arrival time 150 and be matched with an available parking space, as further described below. It should be appreciated that method 100 may allow the arriving user to select and view parking data, such as shown in FIG. 6 that depicts a screen shot of an application for identifying a parking space according to an embodiment of the present disclosure. It should be appreciated that the parking data may include but is not limited to "Parking Location," "Get me there," and a name and address of an authorized location. It should be appreciated that parking data also may provide interactive maps, voice instruction, and/or the ability to contact an employee located within an authorized location for assistance according to some embodiments of the present disclosure. It should be appreciated that an authorized location may be determined by comparing the geographic location of an arriving vehicle with a plurality of predetermined authorized locations. It should further be appreciated that authorized locations may be displayed by category in an application. Categories may include, but may not be limited to, restaurants, coffee shops, bars, venues, fitness-related locations, and other retail locations. It should also be appreciated that authorized locations need not be categorized in some embodiments of the present disclosure. It should be appreciated that an arriving user may select one or more authorized locations from a drop-down list or menu that may display a plurality of authorized locations; however, other selection mechanisms may be utilized without departing from the present disclosure. It should be appreciated that in some embodiments of the present disclosure, authorized locations may not be predetermined and may be input into an application by the arriving user without departing from the present disclosure.

Figure 3:
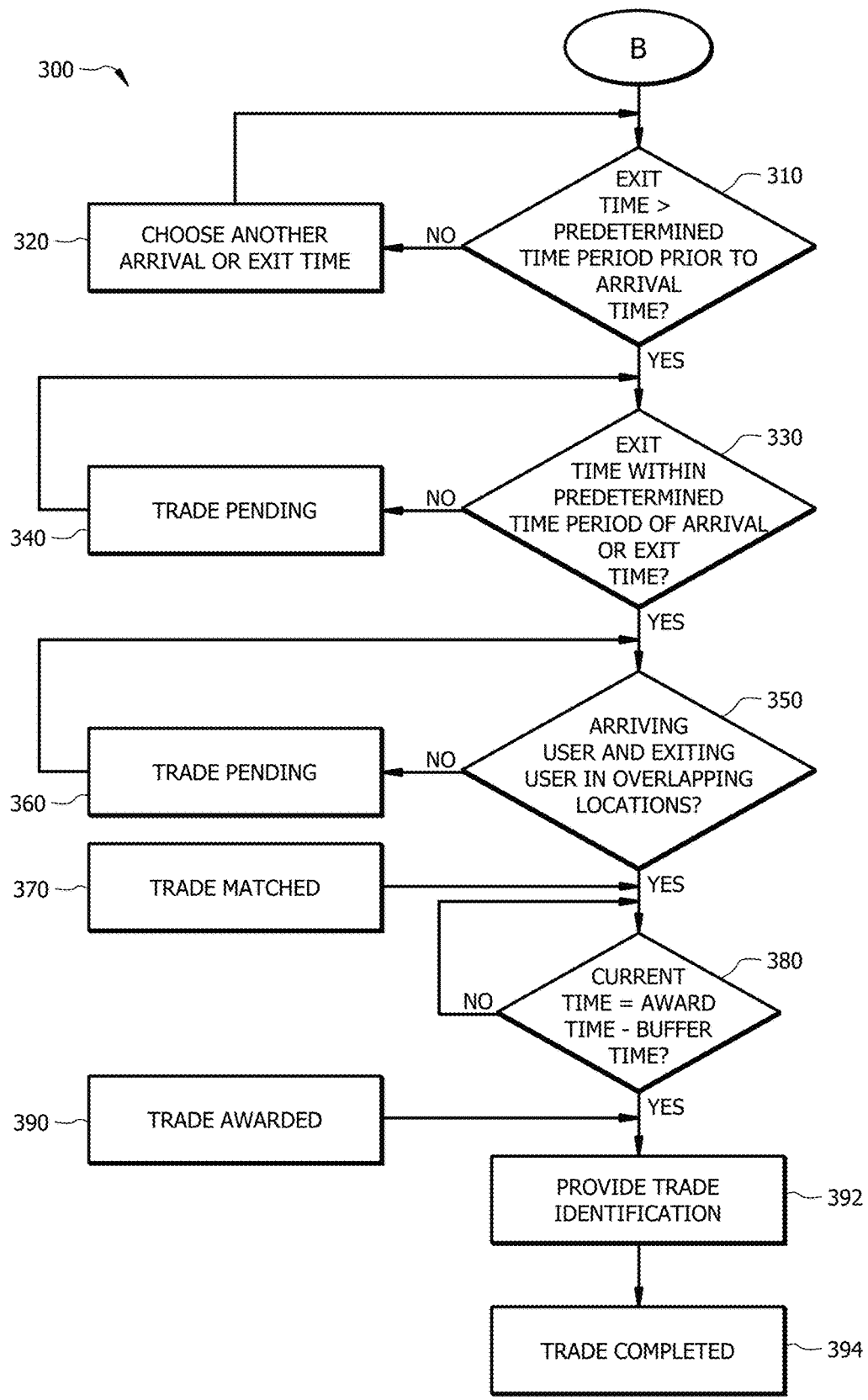
FIG. 3 depicts a method for matching an arrival time and an exit time, as depicted in FIGS. 1 and 2, according to an embodiment of the present disclosure.
Figure 7:
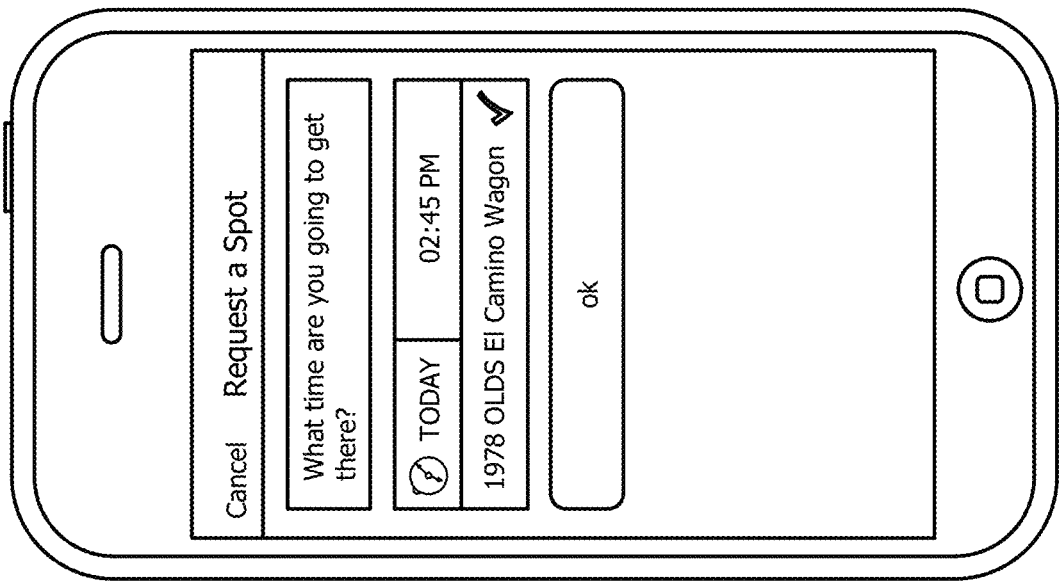
FIG. 7 depicts a screen shot from an application for identifying a parking space in which an arrival time is selected according to an embodiment of the present disclosure.
Figure 9:
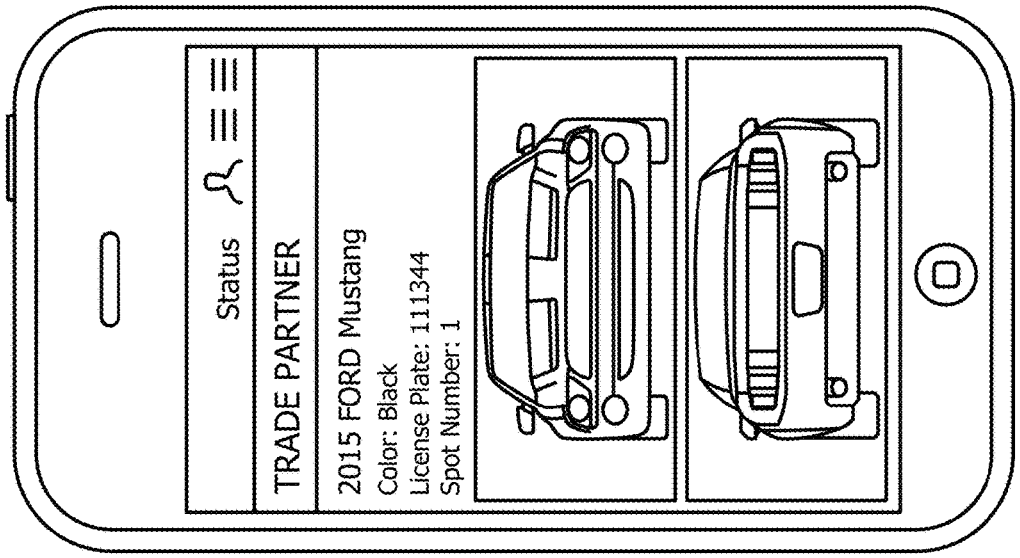
FIG. 9 depicts a screen shot from an application for identifying a parking space in which a trade identification is provided according to an embodiment of the present disclosure.

As shown in FIG. 1 according to an embodiment of the present disclosure, method 100 may provide the step of allowing the arriving user to select an arrival time 150. It should be appreciated that the arrival time may indicate the time that the arriving user may expect to arrive at an authorized location. It should further be appreciated that the user may select an arrival time from a drop-down list, a menu, or other selection mechanism that may include a plurality of arrival times. In other embodiments of the present disclosure, the arriving user may be permitted to select a range in arrival time as opposed to a specific arrival time. It should be appreciated that the arriving user may confirm the arrival time (i.e. by selecting "OK" in an application, as shown in FIG. 7 according to embodiment of the present disclosure). It should also be appreciated that the arrival time may be selected from preset time increments in some embodiments of the present disclosure. For example, arrival times may be displayed in 5-minute increments in a drop-down menu (e.g., 14:40 PM, 14:45 PM, 14:50 PM, etc.). It should be appreciated that interactive maps may have a margin of error which may determine the preset time increment in which arrival and/or exit times are displayed. For example, a margin of error of approximately one to two minutes may provide a preset time increment of approximately five minutes. It should be appreciated that an arriving user may also be permitted to select a day and/or date that may correspond to an arrival time without departing from the present disclosure. It should be appreciated that an arrival time may be requested within four hours or less of an expected arrival in an authorized parking location without departing from the present disclosure. It should further be appreciated that a day of the week may or may not be selected without departing from the present disclosure. For example, an arriving user may select "Today 14:45 PM," "January 1, 2015 11:20 AM," or "Friday, March 11, 2015 09:00 AM." As shown in FIG. 7 according to an embodiment of the present disclosure, it should be appreciated that an arrival time (i.e. "02:45 PM") may be selected and a make and model of a vehicle may also be selected (i.e. "1978 OLDS El Camino Wagon"). Method 100 may further provide the step of matching an arrival time and exit time 160, as further described below. It should be appreciated that "B", as shown in FIGS. 1, 2, and 3, illustrate continuing method 100 regarding the step of matching the arrival time and the exit time 160. Method 100 may provide the step of notifying the arriving user and/or the exiting user 170 when a match between the arrival time and the exit time may occur. Method 100 may provide the step of at least providing the arriving user with a trade identification 180. It should be appreciated that the exiting user may also be provided a trade identification without departing from the present disclosure. It should be appreciated that a trade identification may include, but is not limited to, a location that may be indicated by a parking space number, a picture of a vehicle, and/or a license plate number, such as shown in FIG. 9 according to an embodiment of the present disclosure. It should further be appreciated that other identification information including, but not limited to, text, images, video, and/or audio may be included in a trade identification without departing from the present disclosure. It should be appreciated that a trade identification may provide safely exchanging a parking space between an exiting user and an arriving user. Method 100 may provide the step of completing a trade 190. It should be appreciated that completing a trade may include allow the arriving user to become an exiting user. For example, while completing a trade, an application may display to the arriving user a message (i.e., "You parked in a blue dot lot! Want to trade your parking spot for money? Choose the time you'd like to offer your spot for trade.") It should be appreciated that method 100 may provide the step of providing data to the arriving user and/or the exiting user 142. It should be appreciated that data may include, but may not be limited to, a name and/or address that may correspond to an authorized location, a map, driving instructions, and/or a parking status badge (i.e., real-time parking availability in an authorized location). It should further be appreciated that a map may display parking space vacancies and/or occupied parking spaces in real-time in some embodiments of the present disclosure. It should also be appreciated that a parking status badge may include but is not limited to a total quantity of parking spaces, a total quantity of occupied parking spaces, and/or a total quantity of vacant parking spaces in some embodiments of the present disclosure. It should be appreciated that a parking status badge may change color or shading to indicate a parking status. For example, a parking status badge may change from gray to blue as a user is exiting a parking space. It should be appreciated that data also may include a percentage of real-time occupancy that may be displayed to an arriving user and/or an exiting user (e.g., "Parking lot occupancy is currently 97%.") in some embodiments of the present disclosure.

As depicted in FIG. 2 according to an embodiment of the present disclosure, method 200 may provide the step of selecting an exit time 210 that may be selected by an exiting user. It should be appreciated that a plurality of exiting users may select the same exit time without departing from the present disclosure. It should further be appreciated that the exit time may indicate the time (or time range) that the exiting user may expect to remove an exiting vehicle from a parking space. It should be appreciated that the exiting user may select the exit time from a drop-down list or a menu that may include a plurality of exit times; however, other selection mechanisms may be utilized without departing from the present disclosure. It should also be appreciated that the exiting user may confirm the exit time (i.e. by selecting "OK" in an application). It should be appreciated that the exit time may be selected from preset time increments in some embodiments of the present disclosure. For example, exit times may be displayed in 5-minute increments in a drop-down menu (e.g., 14:45 PM, 14:50 PM, 14:55 PM, etc.); however, there may be other embodiments in which an exiting user may select a particular exit time or a time range. It should be appreciated that an exit time may be requested within four hours or less of an expected exit in an authorized parking location without departing from the present disclosure. It should further be appreciated that a day of the week may not be selected without departing from the present disclosure. It should be appreciated that the exiting user may select a day and/or date that may correspond to the exit time without departing from the present disclosure. For example, the exiting user may select "Today 14:50 PM," "January 1, 2015 11:25 AM," or "Friday, March 11, 2015 09:05 AM." Method 200 may also provide the step of displaying an option for an exiting user to offer a parking space to an arriving user 220 (e.g., by selecting "Offer Spot" in an application). It should be appreciated that an exiting user may choose not to offer a parking space without departing from the present disclosure (e.g., by selecting "Not Now" in an application). Method 200 may provide the step of matching an arrival time and an exit time 230, as further described below. It should be appreciated that "B", as shown in FIGS. 1, 2, and 3, illustrates matching the arrival time and the exit time. Method 200 may provide the step of notifying the arriving user and/or the exiting user 240 of a match between the arrival time that may be specified by an arriving user and the exit time specified by an exiting user. Method 200 may provide the step of providing at least the arriving user with a trade identification 250. It should be appreciated that the exiting user may also be provided a trade identification without departing from the present disclosure. It should be appreciated that a trade identification may include but is not limited to a location that may be indicated by a parking space number, a picture of a vehicle, and a license plate number, as shown in FIG. 9 according to an embodiment of the present disclosure. It should further be appreciated that other identification information including, but not limited to, text, images, video, and/or audio may be included in a trade identification without departing from the present disclosure. Method 200 may provide the step of completing a trade 260. It should be appreciated that method 200 may provide the step of providing data to the arriving user and/or the exiting user 270. It should be appreciated that data may include, but may not be limited to, a name and/or address that may correspond to an authorized location, a geographic map, traffic reports, authorized locations frequently selected by the arriving user, driving instructions, and/or a parking status badge (i.e., real-time parking availability in an authorized location). It should be appreciated that the step of providing data to the arriving user and the exiting user may include displaying a status of identifying a parking space (e.g., "11:30 AM, Friday, October 2nd; Arrival Pending; Parking Location: 2703 Elm Street, Dallas, TX 75226"). It should further be appreciated that a map may display parking space vacancies and/or occupied parking spaces in real-time. It should also be appreciated that a parking status badge may include but is not limited to a total quantity of parking spaces, a total quantity of occupied parking spaces, and/or a total quantity of vacant parking spaces. It should be appreciated that an exiting user may not have used method 200 when the exiting user parked in the parking space. It should also be appreciated that when an exiting user did not use method 200 when the exiting user parked in the parking space, the exiting user may select an authorized location when the exiting user removes an exiting vehicle from the parking space. It should be appreciated that the exiting user may select an authorized location prior to selecting an exit time without departing from the present disclosure.

Figure 8:
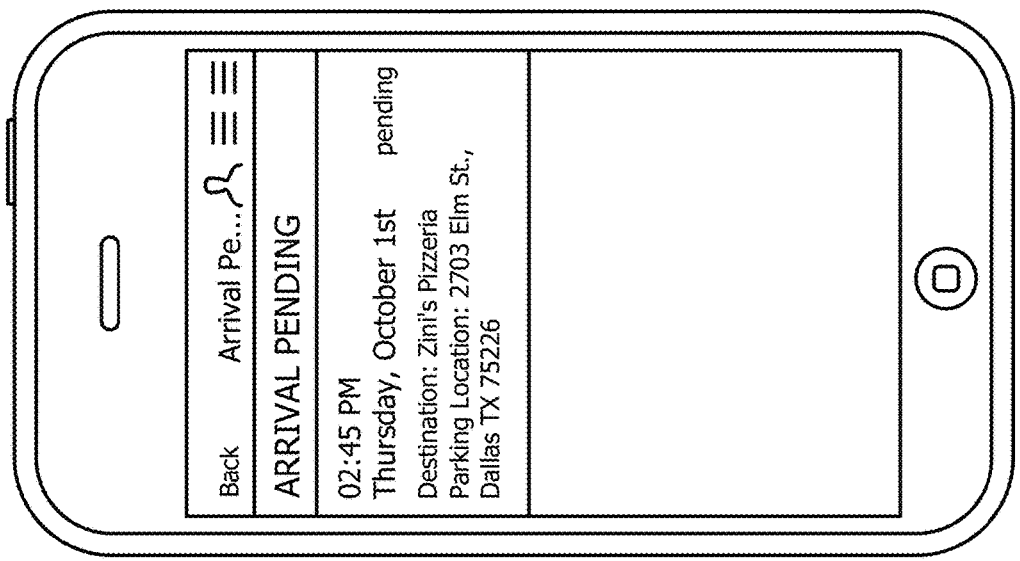
FIG. 8 depicts a screen shot from an application for identifying a parking space in which an arrival is pending according to an embodiment of the present disclosure.

As depicted in FIG. 3 according to an embodiment of the present disclosure, matching the arrival time and the exit time (FIG. 1, step 160 and FIG. 2, step 230) may include method 300. Method 300 may provide the step of determining whether an exit time that may be selected by an exiting user (FIG. 2, step 210) may be greater than a first predetermined time period prior to the arrival time selected by the arriving user (FIG. 1, step 150) 310. For example, if the first predetermined time period prior to the arrival time is set as 15 minutes, and the arriving user may have requested an arrival time of 6:00 PM, method 300 may provide the step of determining whether the exiting user has requested an exit time greater than 15 minutes prior to 6:00 PM (i.e., prior to 5:45 PM). When the exit time is less than the first predetermined time period prior to the arrival time selected by the arriving user (310—NO), method 300 may provide the step of allowing the arriving user to choose another arrival time and/or the exiting user to choose another exit time 320. For example, if the first predetermined time period prior to the arrival time selected by the arriving user is set as 15 minutes, the arrival time is 6:00 PM, and the exit time is 5:55 PM, method 300 may provide the step of informing the arriving user that the exit time must be at least a first predetermined time period prior to the requested trade time (i.e., "Sorry, exit request must be at least 15 minutes before requested trade time."). After another arrival time or exit time is selected, method 300 may provide returning to the step of determining whether an exit time that may be selected by an exiting user may be greater than a first predetermined time period prior to the arrival time selected by the arriving user 310. It should be appreciated that in order for method 300 to continue past step 310 (i.e. continue to 310—YES), the exit time must be greater than the first predetermined time period prior to the arrival time. When the exit time is greater than the first predetermined time period prior to the arrival time selected by the arriving user (310—YES), method 300 may provide the step of determining whether the exit time is within a second predetermined time period of the arrival time or the exit time 330 (i.e., a second predetermined time period prior to the arrival time or the exit time, and a second predetermined time period after the arrival time or the exit time). For example, if the second predetermined time period prior to the arrival time selected by the arriving user is set as 10 minutes and the arrival time is 6:00 PM, method 300 may provide the step of determining whether there are unmatched exit offers between arriving users and exiting users between 5:50 PM and 6:00 PM. It should be appreciated that method 300 may provide the step of determining whether the exit time is within a second predetermined time period within the arrival time 330, when the arriving user may select an arrival time (FIG. 1, step 150). It should be appreciated that method 300 may provide the step of determining whether the exit time is within a second predetermined time period prior to the exit time 330, when the exiting user may select an exit time (FIG. 2, step 210). When the exit time is not within a second predetermined time period prior to the arrival time or the exit time (330—NO), method 300 may provide the step of informing the arriving user and/or the exiting user that a trade is pending 340 (i.e., displaying "arrival pending" in an application, as depicted in FIG. 8 according to an embodiment of the present disclosure). As shown in FIG. 8 according to an embodiment of the present disclosure, the pending arrival of an arriving vehicle in a parking space near "Zini's Pizzeria" may be displayed in an application with the text "arrival pending." However, other text or another indicator may be displayed to indicate a trade is pending without departing from the present disclosure. For example, as depicted in FIG. 8, the application may display a date and time for the trade and the address of the location.

It should be appreciated that an arriving user may become an exiting user. It should further be appreciated that should an arriving user become an exiting user, method 300 may provide the step of determining whether the exit time is greater than a third predetermined time period prior to the arrival time 310, and may provide the step of determining whether the exit time is within a fourth predetermined time period of the arrival time 330, as the first and second predetermined time periods may correspond to the arriving user and the third and fourth predetermined time periods may correspond to the exiting user.

As depicted in FIG. 3 according to embodiment of the present disclosure, method 300 may provide the step of determining whether the location of an arriving user and the location of an exiting user overlap 350 (330—YES). For example, if the location of the arriving user is far away from authorized location A, and the location of the exiting user is near authorized location A, then the location of the arriving user and the location of the exiting user may not overlap (350—NO). When the arriving user and exiting user are not located in overlapping locations, method 300 may provide the step of informing the arriving user and/or the exiting user that their respective locations do not overlap 360 (i.e. displaying "trade pending" in an application). It should be appreciated that displaying a parking status badge may include displaying "trade pending", "trade matched", "trade awarded", and/or "trade completed" without departing from the present disclosure. On the other hand, if the arriving user is located near authorized location A and the exiting user is also located near authorized location A, the location of the arriving user and the location of the exiting user may overlap (350—YES). When the arriving user and the exiting user are located in overlapping locations, method 300 may provide the step of informing the arriving user and/or the exiting user that their respective locations overlap 370 (i.e. displaying "trade matched" in an application). As shown in FIG. 9 according to an embodiment of the present disclosure, an arriving user may be provided information that may help to identify an exiting user ("trade partner"). In other embodiments of the present disclosure, an exiting user may also be provided with information to identify an arriving user. Method 300 may further provide the step of determining whether a current time is equivalent to a difference between an award time and a buffer time 380 (i.e. current time=award time−buffer time). When the current time is not equivalent to the difference between the award time and the buffer time (380-NO), method 300 may continue to determine whether a current time is equivalent to a difference between an award time and a buffer time until the current time is equivalent. It should be appreciated that a trade may not be awarded and completed until the current time is equivalent to a difference between an award time and a buffer time. When the current time is equivalent to the difference between the award time and the buffer time (380—YES), method 300 may provide the step of informing the arriving user and/or the exiting user that a trade may be awarded 390 (i.e. displaying "trade awarded" in an application). Method 300 may provide the arriving user and/or the exiting user with a trade identification 392. It should be appreciated that a trade identification may include but is not limited to a location that may be indicated by a parking space number, one or more pictures of a vehicle (i.e., front of the vehicle, back of the vehicle, and/or specific items that may identify the vehicle such as a specific window/bumper sticker or other marking on the vehicle), the color of the vehicle, and a license plate number, as depicted in FIG. 9 according to an embodiment of the present disclosure. It should further be appreciated that identification information including, but not limited to, text, images, video, and/or audio may be included in a trade identification without departing from the present disclosure. Method 300 may further provide the step of completing a trade 394. It should be appreciated that completing a trade may include allow the arriving user to become an exiting user. For example, while completing a trade, an application may display to the arriving user a message (i.e., "You parked in a blue dot lot! Want to trade your parking spot for money? Choose the time you'd like to offer your spot for trade."). It should be appreciated that completing a trade may provide detecting when an exiting user removes an exiting vehicle from a parking space and/or may provide detecting when an arriving user moves an arriving vehicle into the parking space. It should be appreciated that detecting movement of a vehicle into a parking a space and movement of a vehicle out of a parking space may utilize a sensor according to some embodiments of the present disclosure.

Figure 4:
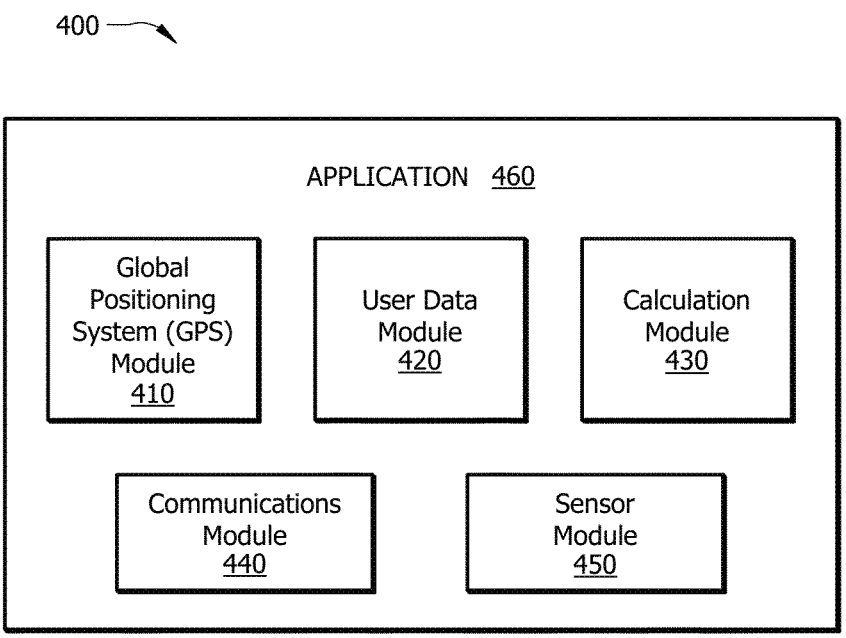
FIG. 4 depicts a system for identifying a parking space according to an embodiment of the present disclosure.

As depicted in FIG. 4 according to embodiment of the present disclosure, system 400 for identifying a parking space may be provided on a mobile device and may include application 460 that may provide a plurality of modules. The plurality of modules may include global positioning system (GPS) module 410, user data module 420, calculation module 430, communications module 440, and sensor module 450. It should be appreciated that more or fewer modules may be incorporated into system 400 without departing from the present disclosure.

Communications module 440 may be provided to receive a selection of the authorized location provided by the arriving user and a request for a parking space provided by the arriving user. It should be appreciated that communications module 440 may be provided to scan for available parking spaces when a selection of an authorized location is received. It should further be appreciated that the arriving user may not select a specific parking space. It should be appreciated that the arriving user may select an arrival time 150 (FIG. 1) and may be matched with an available parking space of an exiting user, as further described below. GPS module 410 may provide driving directions to the arriving user. It should be appreciated that GPS module 410 may provide driving directions to the arriving user whether or not the arriving user is located in an authorized location. Communications module 440 may further be provided to display at least one authorized location, when the arriving user is not located in an authorized location. Further, communications module 440 may instruct the arriving user to move an arriving vehicle to an authorized location. Calculation module 430 may be provided to match an arrival time with an exit time. Communications module 440 may allow the arriving user to select the arrival time and an exiting user to select an exit time in application 460. Communications module 440 may be provided to notify the arriving user and the exiting user of a matching arrival time and exit time. Additionally, communications module 440 may provide at least one of the arriving user and the exiting user with a trade identification. It should be appreciated that a trade identification may include but is not limited to a location that may be indicated by a parking space number, a picture of a vehicle, and a license plate number, as depicted in FIG. 9 according to an embodiment of the present disclosure. It should further be appreciated that any identification information including, but not limited to, text, images, video, and/or audio may be included in a trade identification without departing from the present disclosure. Sensor module 450 may be provided to complete a trade and may detect when an exiting user removes an exiting vehicle from a parking space and/or may detect when an arriving user moves an arriving vehicle into the parking space. It should be appreciated that sensor module 450 may be needed to operate system 400 according to some embodiments of the present disclosure.

User data module 420 may include data corresponding to one or more of the following: a plurality of authorized locations, the arriving user, the arriving vehicle, the exiting user, and the exiting vehicle. It should be appreciated that data may include, but may not be limited to, a name and/or address that may correspond to an authorized location, a geographic map, traffic reports, authorized locations frequently selected by the arriving user, driving instructions, and a parking status badge (i.e., real-time parking availability in an authorized location). It should further be appreciated that a map may display parking space vacancies and/or occupied parking spaces in real-time. It should also be appreciated that the parking status badge may include but is not limited to a total quantity of parking spaces, a total quantity of occupied parking spaces, and/or a total quantity of vacant parking spaces. It should further be appreciated that data may include a percentage of real-time occupancy that may be displayed to an arriving user and/or an exiting user (e.g., "Parking lot occupancy is currently 97%.") in some embodiments of the present disclosure.

As depicted in FIG. 4 according to an embodiment of the present disclosure, system 400 may include calculation module 430 that may be provided to perform a plurality of calculations. The plurality of calculations may include calculating whether an exit time is greater than a first predetermined time period prior to an arrival time. For example, if the first predetermined time period prior to the arrival time selected by the arriving user is set as 15 minutes, the arrival time is 6:00 PM, and the exit time is 5:55 PM, then calculation module 430 may calculate whether 5:55 PM is greater than 15 minutes prior to 6:00 PM. Calculation module 430 may also calculate whether an exit time is within a second predetermined time period of the arrival time (i.e., a second predetermined time period prior to the arrival time or the exit time, and a second predetermined time period after the arrival time or the exit time). Further, calculation module 430 may calculate whether an arriving user and an exiting user are located within overlapping authorized locations. Calculation module 430 may be provided to calculate whether an exit time is greater than a third predetermined time period prior to an arrival time and to calculate whether an arrival time is within a fourth predetermined time period of an exit time. Calculation module 430 may further be provided to calculate whether a current time is equivalent to a difference between an award time and a buffer time.

As depicted in FIG. 4 according to an embodiment of the present disclosure, system 400 may include user data module 420 that may store or include a plurality of data. The plurality of data may include, but may not be limited to, a name and/or address that may correspond to an authorized location, a geographic map, traffic reports, authorized locations frequently selected by the arriving user, driving instructions, and a parking status badge (i.e., real-time parking availability in an authorized location). System 400 may further provide sensor module 450 that may detect movement of a plurality of exiting vehicles that may be removed from a plurality of parking spaces and/or may detect a plurality of arriving vehicles that may be moved into a plurality of parking spaces.

Figure 5:
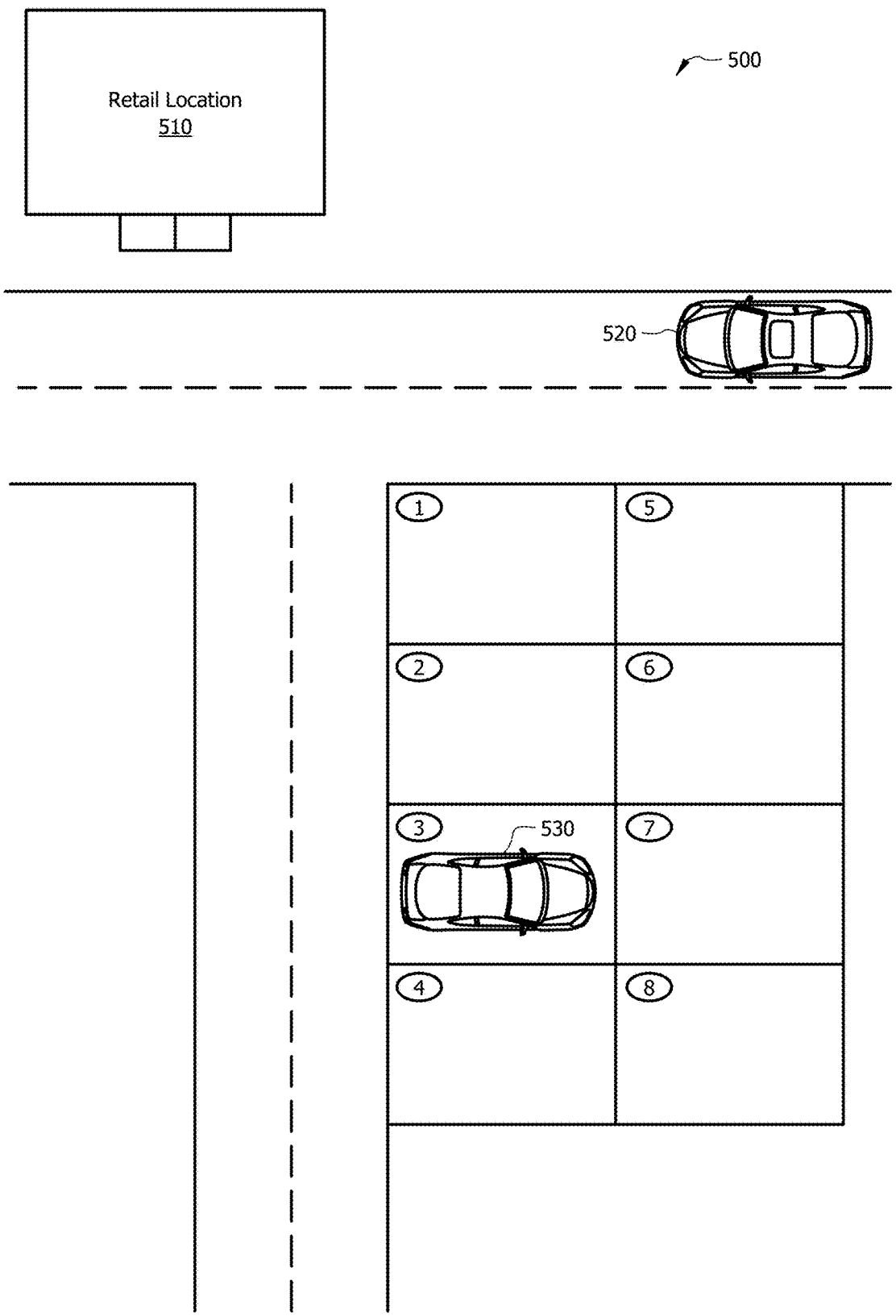
FIG. 5 depicts an authorized location according to an embodiment of the present disclosure.

As depicted in FIG. 5 according to an embodiment of the present disclosure, authorized location 500 may be provided proximate a plurality of parking spaces. An arriving user in arriving vehicle 520 may be located in authorized location 500. An exiting user in exiting vehicle 530 may also be located in authorized location 500. The arriving user may select retail location 510 when using a method and a system of identifying a parking space. The exiting user may have visited retail location 510 and/or may select retail location 510 when using a method and a system of identifying a parking space according to embodiments of the present disclosure. It should be appreciated that authorized location 500 may encompass specific locations including, but not limited to, a plurality of parking spaces, streets, and/or retail locations. The arriving user may communicate with the exiting user, so that arriving vehicle 520 may reserve parking space 3 for the time when exiting vehicle 530 may be removed from parking space 3. Alternatively, it should be appreciated that arriving vehicle 520 may park in vacant parking spaces 1-2 and 4-8 without departing from the present disclosure.

Figure 10:
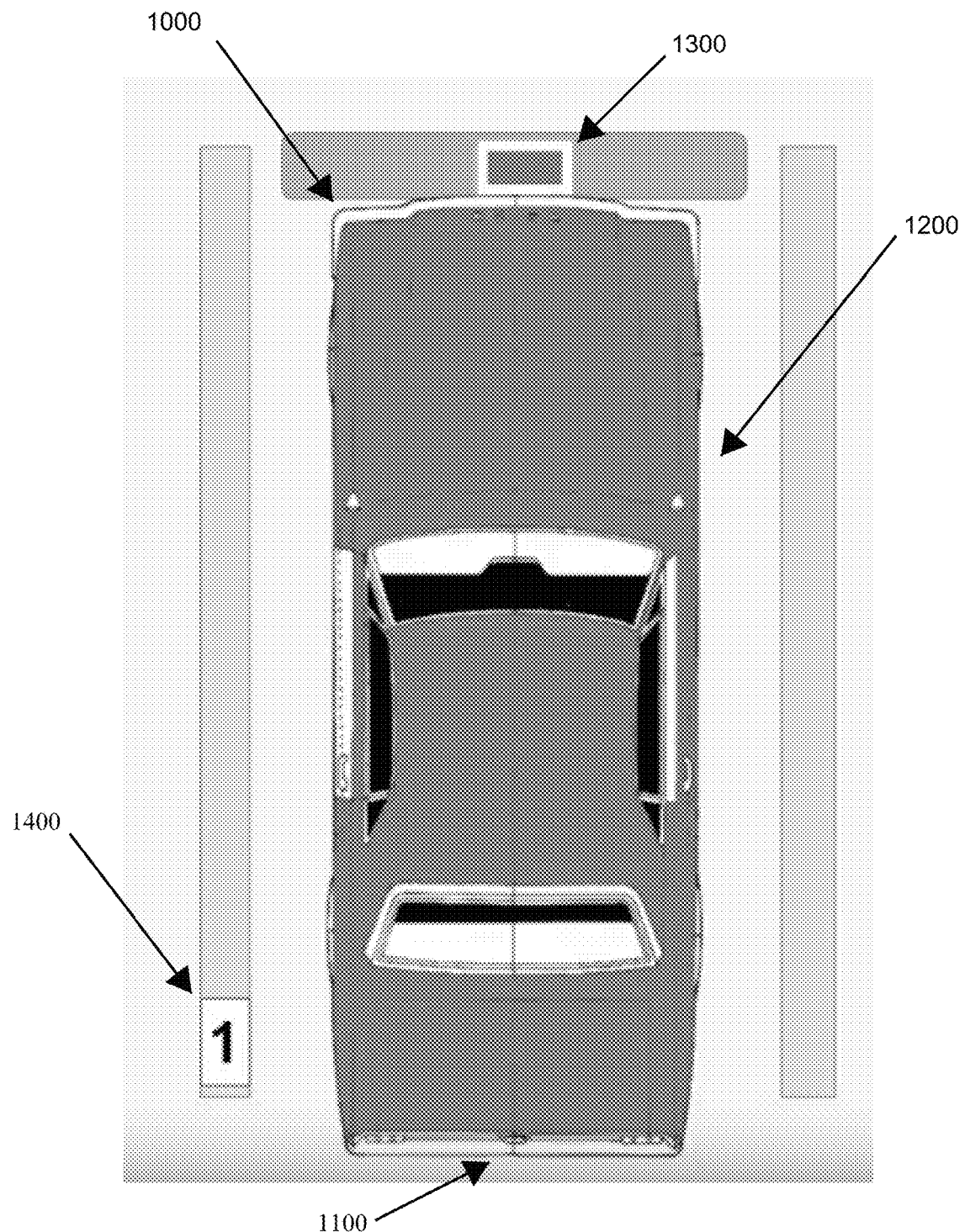
FIG. 10 depicts a parking space in an authorized location according to an embodiment of the present disclosure.

As depicted in FIG. 10 according to an embodiment of the present disclosure, the arriving user and/or the exiting user may be provided with a push notification including a trade identification (i.e. "Trade time is here! Use these pics to identify your trade partner."). Arriving vehicle and/or exiting vehicle 1000 may include beacon 1100 that may be detected in parking space 1200 of an authorized location using spot sensor 1300. It should be appreciated that beacon 1100 may be provided anywhere on vehicle 1000. It should further be appreciated that spot sensor 1300 may determine when parking space 1200 is available (vacant) in some embodiments of the present disclosure. It should be appreciated that the arriving user and/or the exiting user may be provided with one or more push notifications when using a system and method for identifying a parking space according to an embodiment of the present disclosure. It should be appreciated that a user may receive a push notification when the user's vehicle may be identified by spot sensor 1300. Parking space 1200 may include visible indicator 1400 that may help the user identify parking space 1200. It should be appreciated that the arriving user and/or the exiting user may be provided with a hands-free method and system of identifying parking space 1200 according to some embodiments of the present disclosure.

It should be appreciated that an arriving user may elect to park in an available (vacant) parking space without departing from the present disclosure. There may be some times of the day when more parking spaces are available. In such instances, an arriving user may still elect to use the method and system according to embodiments of the present disclosure. For example, an arriving user may use the method and system when he/she is parking prior to a busy time in the authorized location (i.e., the arriving user arrives just prior to happy hour at a bar), and this may enable the arriving user to become an exiting user and trade the parking space when parking spaces are at a premium. It should be appreciated that the system and method for identifying a parking space may provide access to parking spaces that may be as close as possible to an authorized location. There also may be embodiments of the present disclosure where an arriving user may elect to use the method and system in order to be eligible for coupons, points, and/or gift certificates that may be offered through use of the system and method.

Figure 12:
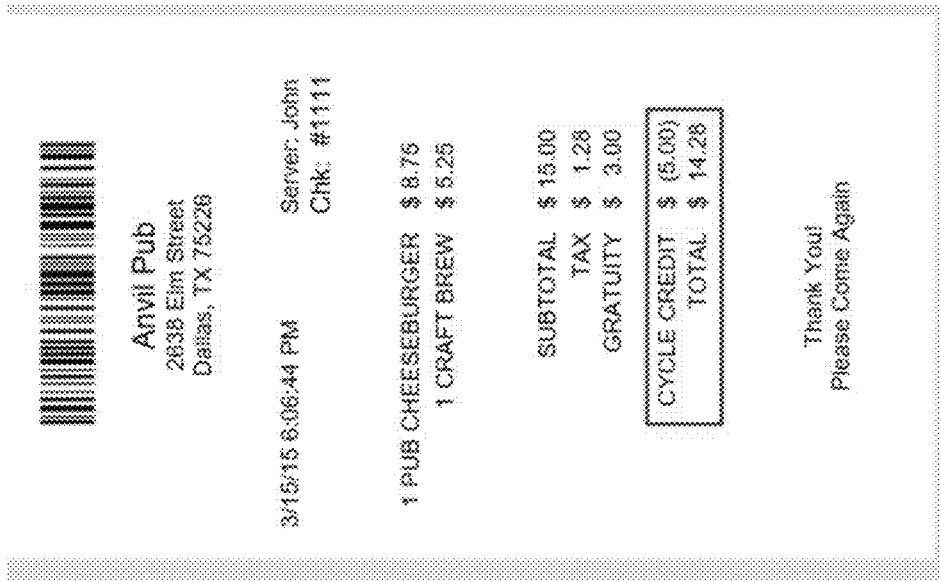
FIG. 12 depicts a screen shot from an application for identifying a parking space in which a user applied a credit to a bill according to an embodiment of the present disclosure.
Figure 11:
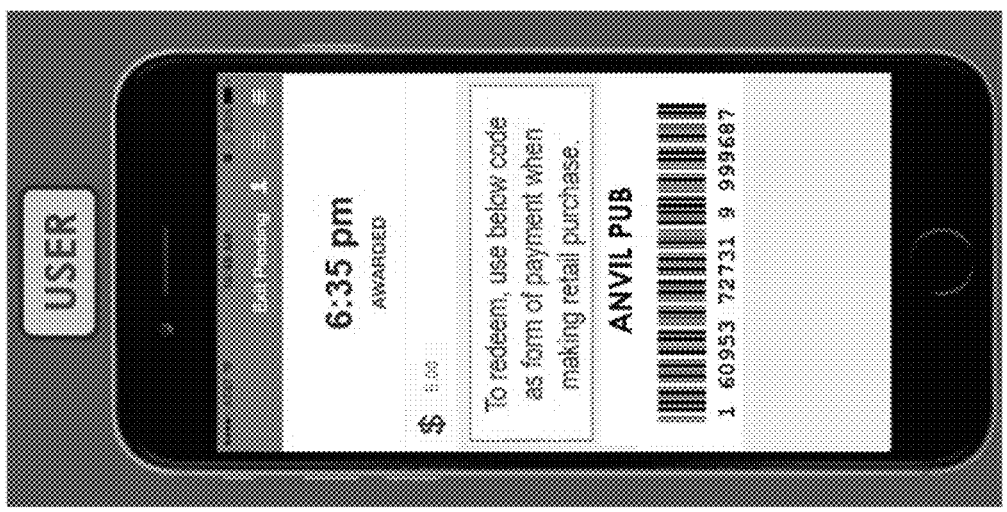
FIG. 11 depicts a screen shot from an application for identifying a parking space in which a user received a credit according to an embodiment of the present disclosure.

It should also be appreciated that retailers, restaurants, and/or businesses that may be located in an authorized location may be marketed and promoted using a method and a system for identifying a parking space by awarding arriving users and/or exiting users with coupons, points, and/or gift certificates for using the method and system for identifying a parking space according to embodiments of the present disclosure. Again, offering these rewards or incentives to arriving and/or exiting users may encourage use of the method and system according to embodiments of the present disclosure even when sufficient parking may be available at a given time in an authorized location. It should be appreciated that a credit may be applied to a user account when a trade is completed. It should further be appreciated that a user may be notified when a credit is applied to his/her user account (i.e. "Awarded $5.00. To redeem, use below code as form of payment when making retail purchase."). It should be appreciated that a user may receive a credit (FIG. 11) that may be applied to a bill at an authorized location (FIG. 12) in some embodiments of the present disclosure. It should be appreciated that authorized locations may be provided with the ability to view data corresponding to arriving users and/or exiting users according to some embodiments of the present disclosure.

It should be appreciated that an authorized location may include 15 to 40 parking spaces in some embodiments of the present disclosure; however, in other embodiments of the present disclosure, an authorized location may include any number of parking spaces. There also may be embodiments of the present disclosure wherein parking spaces that may be selected using the method and system may be separated from other generally available parking spaces, such as by using a gate or an attendant.

It should be appreciated that visible markers may be placed on parking spaces in some embodiments of the present disclosure. These visible markers may be small, reflective markers in some embodiments of the present disclosure so that they may be visible to arriving and existing users but may not be distracting to others in the authorized location (i.e., pedestrians). In some embodiments of the present disclosure, the visible markers may change color or provide some other indication when a parking space has been reserved.

It should be appreciated that parking according to embodiments of the present disclosure may be free to arriving users and exiting users; however, there may be other embodiments of the present disclosure wherein a deposit may be made by an arriving and/or exiting user that may be refunded in whole or in part upon completing a trade. It should be appreciated that users may purchase a trade, as opposed to purchasing a parking space, in some embodiments of the present disclosure. It should be appreciated that authorized locations may be assigned at least one parking price schedule according to some embodiments of the present disclosure (e.g., a parking price schedule may correspond to what arriving users pay for a parking space and/or what exiting users receive for offering a parking space). It should be appreciated that authorized parking price schedules may be based on predetermined increments of time, such that a dollar value may be assigned based on predetermined increments of time (e.g., an exiting user may pay $4.00 at 5:40 PM, $4.50 at 5:45 PM, $5.00 at 5:50 PM, etc.) according to some embodiments of the present disclosure. In other embodiments of the present disclosure, the arriving user may be charged based on predetermined increments of time along with the exiting user or in place of the exiting user. It should be appreciated that predetermined increments of time may be based on 5-minute time increments without departing from the present disclosure; however, the specific time increments may vary according to embodiments of the present disclosure. It should further be appreciated that the price an arriving user and an exiting user pays may be determined based on a time of a matched arrival time and exit time, as opposed to an amount of time a user remains in a parking space, without departing from the present disclosure. It should be appreciated that a parking price schedule may increase values that may be included in the parking price schedule as demand for parking spaces increases according to some embodiments of the present disclosure. It should be appreciated that parking demand in an authorized location or area may be measured and compared over a time period. It should be appreciated that a parking price schedule may be set according to the parking demand. For example, a high demand may provide a more expensive price schedule and a low demand may provide a less expensive price schedule. It should be appreciated that an inventory of available (vacant) parking spaces may be created during peak or high demand hours.

It should be appreciated that the system and method of identifying parking according to embodiments of the present disclosure may monitor location data that may detect a user's location and drive-time to an authorized location in real-time. If it is not possible for a user to satisfy an arrival time after evaluation of the user's location data and drive-time, the method and system may automatically cancel a parking space request and return any value that the user may have provided in exchange for an intended parking space. It should be appreciated that an arriving user and/or an exiting user may cancel a request for a parking space prior to a completed trade without penalty. It should also be appreciated that parking spaces may be pre-approved as legal parking spaces without departing from the present disclosure. It should be appreciated that Bluetooth hardware may be provided to help a user identify a parking space without departing from the present disclosure. It should further be appreciated that infrared quick response (QR) codes may be provided to help a user identify a parking space without departing from the present disclosure. However, other similar hardware/software may be utilized to assist in identifying a parking space without departing from the present disclosure.

It should be appreciated that a plurality of user interfaces may be utilized including, but not limited to, a graphical user interface, a web-based interface, and a text-based interface without departing from the present disclosure. Similarly, the configuration of the chosen user interface may differ without departing from the present disclosure. For example, the configurations depicted in FIGS. 6-9 may change (i.e., the placement of the information, the way that information is displayed, the icons used, etc.) according to embodiments of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A computer-implemented method of identifying a parking space, comprising:
    displaying, by a processor, at least one authorized location in a drop-down list or a menu via a computer application;
    selecting, by a processor, the at least one authorized location from the computer application and requesting the parking space, wherein an arriving user selects the at least one authorized location from the computer application;
    receiving, by a processor, other authorized locations input into the computer application by the arriving user, wherein the other authorized locations are not predetermined;
    matching, by a processor, an arrival time with an exit time, wherein the arriving user selects the arrival time and an exiting user selects the exit time;
    notifying, by a processor, the arriving user and the exiting user of a match between the arrival time and the exit time;
    displaying, by a processor, a trade identification to at least one of the arriving user and the exiting user, wherein the trade identification includes information identifying at least one of an arriving vehicle and an exiting vehicle; and
    completing a trade, by a processor, wherein the exiting user removes the exiting vehicle from the parking space and the arriving user moves the arriving vehicle into the parking space.

2. The computer-implemented method of identifying the parking space of claim 1, further comprising:
    determining whether the exit time is greater than a first predetermined time period prior to the arrival time;
    determining whether the exit time is within a second predetermined time period of the arrival time; and
    determining whether the arriving user and the exiting user are within overlapping authorized locations.

3. The computer-implemented method of identifying the parking space of claim 2, wherein matching the arrival time with the exit time further comprises:
    determining whether the exit time is greater than a third predetermined time period prior to the arrival time; and
    determining whether the arrival time is within a fourth predetermined time period of the exit time.

4. The computer-implemented method of identifying the parking space of claim 1, wherein displaying the trade identification to at least one of the arriving user and the exiting user further comprises:
    determining whether a current time is equivalent to a difference between an award time and a buffer time.

5. The computer-implemented method of identifying the parking space of claim 1, further comprising:
    displaying user data in the computer application, the user data including any combination of a traffic report, a geographic map, authorized locations frequently selected by the arriving user, and information identifying at least one of the arriving vehicle and the exiting vehicle.

6. The computer-implemented method of identifying the parking space of claim 1, further comprising:
    providing a plurality of parking spaces for a plurality of arriving users and a plurality of exiting users.

7. A non-transitory computer-readable medium to execute a computer-implemented process for identifying a parking space, the computer-implemented process that, when executed on a processor, comprises:
    displaying, by a processor, at least one authorized location in a computer application;
    selecting, by a processor, the at least one authorized location from the computer application and requesting the parking space, wherein an arriving user selects the at least one authorized location from the computer application;
    receiving, by a processor, other authorized locations input into the computer application by the arriving user, wherein the other authorized locations are not predetermined;
    matching, by a processor, an arrival time with an exit time, wherein the arriving user selects the arrival time and an exiting user selects the exit time;
    determining, by a processor, whether the exit time is greater than a first predetermined time period prior to the arrival time;
    determining, by a processor, whether the exit time is within a second predetermined time period of the arrival time; and
    determining, by a processor, whether the arriving user and the exiting user are within overlapping authorized locations;
    notifying, by a processor, the arriving user and the exiting user of a match between the arrival time and the exit time;
    displaying, by a processor, a trade identification to at least one of the arriving user and the exiting user, wherein the trade identification includes information identifying at least one of an arriving vehicle and an exiting vehicle; and
    completing a trade, by a processor, wherein the exiting user removes the exiting vehicle from the parking space and the arriving user moves the arriving vehicle into the parking space.

8. The computer-implemented process of claim 7, further comprising:
    displaying driving instructions to the arriving user, wherein the driving directions correspond to the at least one authorized location.

9. The computer-implemented process of claim 7, wherein matching the arrival time with the exit time further comprises:
    determining whether the exit time is greater than a third predetermined time period prior to the arrival time; and determining whether the arrival time is within a fourth predetermined time period of the exit time.

10. The computer-implemented process of claim 7, wherein displaying the trade identification to at least one of the arriving user and the exiting user further comprises:
determining whether a current time is equivalent to a difference between an award time and a buffer time.

11. The computer-implemented process of claim 7, further comprising:
displaying user data in the computer application, the user data including any combination of a traffic report, a geographic map, authorized locations frequently selected by the arriving user, and information identifying at least one of the arriving vehicle and the exiting vehicle.

12. The computer-implemented process of claim 7, further comprising:
providing a plurality of parking spaces for a plurality of arriving users and a plurality of exiting users.

13. The computer-implemented process of claim 7, further comprising:
providing parking data to at least one of the arriving user or the exiting user, wherein the parking data is displayed in the computer application.

14. The computer-implemented process of claim 7, further comprising:
displaying a parking status badge to at least one arriving user or exiting user in the computer application.

15. A system for identifying a parking space provided on a mobile device, the system comprising:
a communications module provided to receive a selection of an authorized location and a request for the parking space made by an arriving user, wherein the communications module is provided to display the authorized location on the mobile device, wherein other authorized locations are input into the communications module by the arriving user, and wherein the other authorized locations are not predetermined;
a calculation module provided to match an arrival time with an exit time, wherein the arriving user selects the arrival time and an exiting user selects the exit time, wherein the communications module is provided to notify the arriving user and the exiting user of a matching arrival time and exit time, and to provide at least one of the arriving user and the exiting user with a trade identification, wherein the trade identification includes information identifying at least one of an arriving vehicle and an exiting vehicle; and
a sensor module provided to detect at least one of the following:
when the exiting user removes the exiting vehicle from the parking space and when the arriving user moves the arriving vehicle into the parking space, and
wherein the sensor module is provided to complete a trade.

16. The system for identifying the parking space of claim 15, wherein the calculation module is provided to calculate whether the exit time is greater than a first predetermined time period prior to the arrival time, calculate whether the exit time is within a second predetermined time period of the arrival time, and calculate whether the arriving user and the exiting user are within overlapping authorized locations.

17. The system for identifying the parking space of claim 16, wherein the calculation module is provided to calculate whether the exit time is greater than a third predetermined time period prior to the arrival time, and calculate whether the arrival time is within a fourth predetermined time period of the exit time.

18. The system for identifying the parking space of claim 15, wherein the calculation module is provided to calculate whether a current time is equivalent to a difference between an award time and a buffer time.

19. The system for identifying the parking space of claim 15, wherein a user data module includes any combination of a traffic report, a geographic map, authorized locations frequently selected by the arriving user, and information identifying the arriving vehicle.

20. The system for identifying the parking space of claim 15, wherein the sensor module detects movement of a plurality of exiting vehicles from a plurality of parking spaces and a plurality of arriving vehicles into the plurality of parking spaces.

* * * * *